United States Patent
Foster et al.

(10) Patent No.: US 6,861,818 B2
(45) Date of Patent: Mar. 1, 2005

(54) STEPPER MOTOR CONTROLLER SYSTEM AND A METHOD THEREOF

(75) Inventors: Thomas H. Foster, Rochester, NY (US); David L. Conover, Rochester, NY (US); Jarod C. Finlay, Philadelphia, PA (US)

(73) Assignee: University of Rochester, Rochester, NY (US)

( * ) Notice: Subject to any disclaimer, the term of this patent is extended or adjusted under 35 U.S.C. 154(b) by 33 days.

(21) Appl. No.: 10/338,951

(22) Filed: Jan. 8, 2003

(65) Prior Publication Data

US 2003/0222616 A1 Dec. 4, 2003

Related U.S. Application Data

(60) Provisional application No. 60/346,542, filed on Jan. 8, 2002.

(51) Int. Cl.[7] ............................................... G05B 19/40
(52) U.S. Cl. ........................................ 318/685; 318/696
(58) Field of Search ............................. 318/685, 696, 318/569, 600

(56) References Cited

U.S. PATENT DOCUMENTS

| | | | | |
|---|---|---|---|---|
| 3,816,651 A | * | 6/1974 | Gardner ........................ | 348/349 |
| 3,963,971 A | * | 6/1976 | Leenhouts et al. ........... | 318/696 |
| 4,145,644 A | * | 3/1979 | Liu .............................. | 318/696 |
| 4,401,932 A | * | 8/1983 | Hermansdorfer et al. ... | 318/696 |
| 4,535,405 A | * | 8/1985 | Hill et al. ..................... | 700/90 |
| 4,631,657 A | * | 12/1986 | Hill et al. ..................... | 700/63 |
| 6,124,696 A | * | 9/2000 | Rademacher et al. ....... | 318/696 |
| 6,137,252 A | * | 10/2000 | Kojima et al. .............. | 318/586 |

* cited by examiner

*Primary Examiner*—Rina Duda
(74) *Attorney, Agent, or Firm*—Blank Rome LLP

(57) ABSTRACT

A system and method for controlling a stepper motor system includes selecting a size for at least one step to be taken by the stepper motor system and selecting a direction for the at least one step. Once the size and direction of the at least one step are selected, then at least one trigger signal for the at least one step of the selected size and in the selected direction is generated. The generated at least one trigger signal is transmitted to the stepper motor system to take the at least one step at the selected size in the selected direction. A calibrated display keeps track of the current position of the stepper motor system in response to at least one of the selected size and the selected direction.

22 Claims, 10 Drawing Sheets

STEPPER MOTOR CONTROLLER SYSTEM AND A METHOD THEREOF

The present invention claims the benefit of U.S. Provisional Patent application Ser. No. 60/346,542, filed Jan. 8, 2001, which is hereby incorporated by reference in its entirety.

This invention was developed with government funding under National Institute of Health Grant No. CA68409. The U.S. Government may have certain rights.

FIELD OF THE INVENTION

This invention relates generally to control systems and methods and, more particularly, to a stepper motor controller system and a method thereof.

BACKGROUND OF THE INVENTION

A variety of different types of systems require the use of a stepper motor system whose operation needs to be controlled. Typically, the operation of these stepper motor systems is controlled by a computer that executes programmed stepper motor control instructions. Although these types of control systems work, they are difficult and expensive to implement.

SUMMARY OF THE INVENTION

A method for controlling a stepper motor system in accordance with embodiments of the present invention includes selecting a size for at least one step to be taken by the stepper motor system and selecting a direction for the at least one step. Once the size and direction of the at least one step are selected, then at least one trigger signal for the at least one step of the selected size and in the selected direction is generated. The generated at least one trigger signal is transmitted to the stepper motor system to take the at least one step at the selected size in the selected direction.

A stepper motor controller system in accordance with embodiments of the present invention includes a sizing system, a direction system, a generation system, and a transmission system. The sizing system selects a size for at least one step to be taken by the stepper motor system. The direction system selects a direction for the at least one step. The direction system selects a direction for the at least one step. The generation system generates at least one trigger signal for the at least one step of the selected size and in the selected direction. The transmission system transmits the at least one trigger signal to the stepper motor system to take the at least one step at the selected size in the selected direction.

The present invention provides a system and method for automatically incrementing the rotational position of a standard stepper motor system by a pre-programmed amount in a simple, flexible, easy-to-use and low-cost manner. The control of the stepper motor system with the present invention is precise and repeatable. Unlike prior stepper motor controller systems, the present invention does not need a computer and special software to control the stepper motor system. Further, the present invention can be directly interfaced with any transistor-transistor-logic (TTL) compatible stepper motor driver board.

DETAILED DESCRIPTION

Figure 1A:
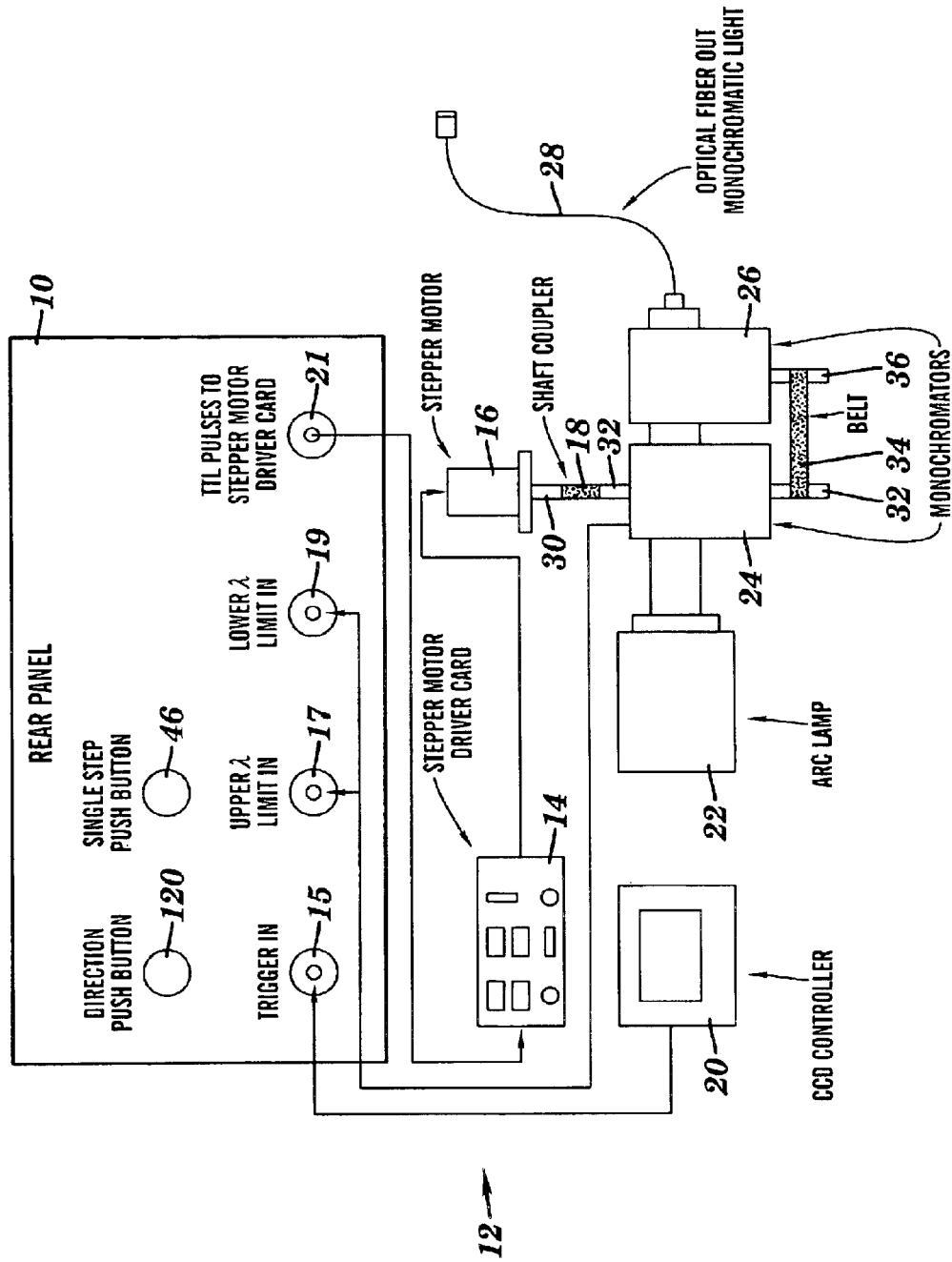
FIG. 1A is a view of a panel of stepper motor controller system in accordance with embodiments of the present invention coupled to a block diagram of a fluorescence excitation/emission scanner system.

A stepper motor controller system 10 in accordance with embodiments of the present invention is connected to a fluorescence excitation/emission scanner system 12 in this exemplary embodiment as illustrated in FIGS. 1A–2E. The stepper motor controller system 10 includes a reset system 54, a clearing system 56, a display loading system 58, a step sizing system 60, a step direction system 62, a starting system 64, size loading system 66, clock pulse enabling system 68, pulse delivery system 70, and a clock pulse divider system 72, although the stepper motor controller system 10 can comprise other numbers and types of components. The present invention provides a system and method that automatically increments the rotational position of a standard stepper motor system by a pre-programmed or selected amount in a simple flexible, easy-to-use and low-cost manner.

Figure 1B:
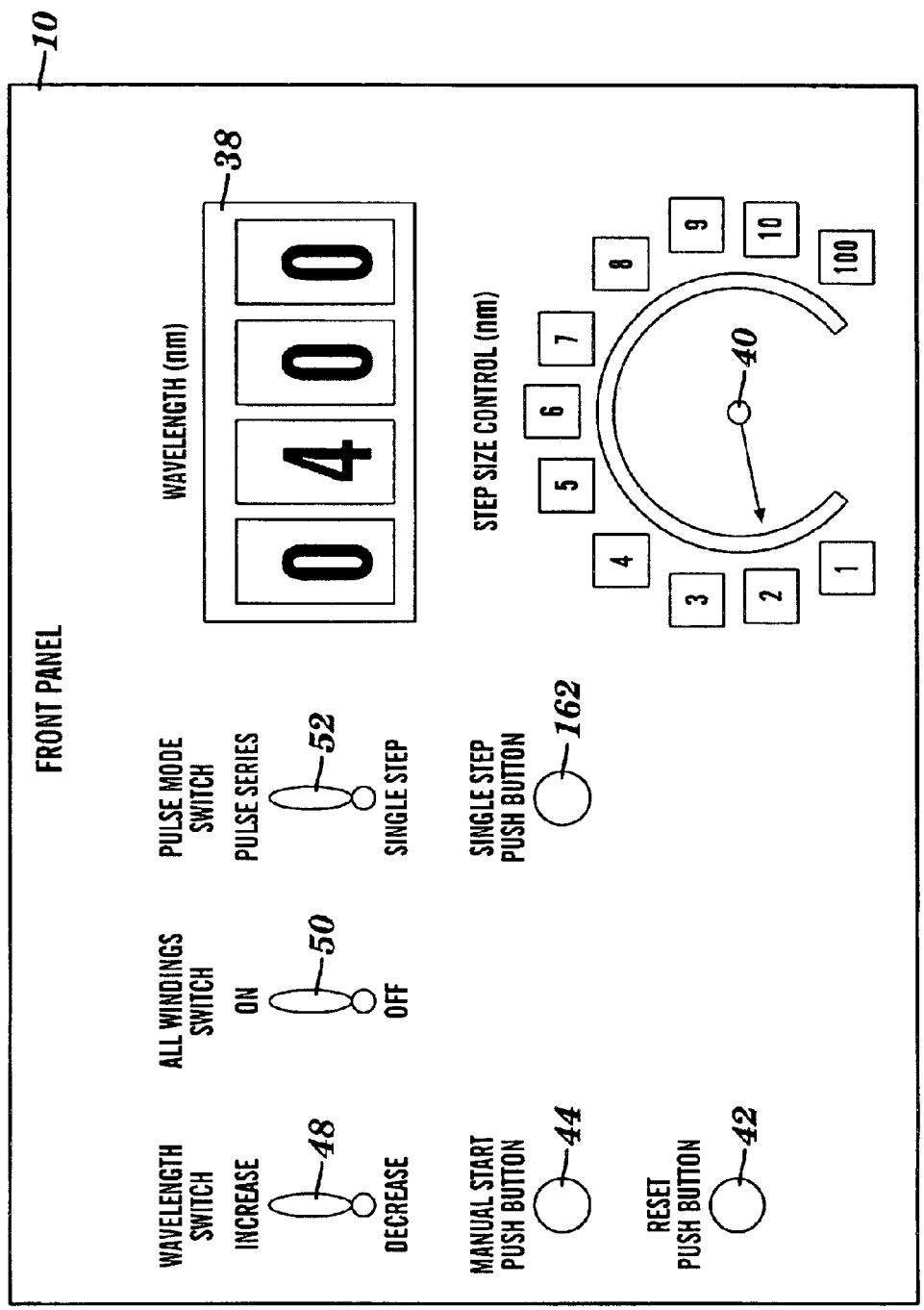
FIG. 1B is a view of another panel of the stepper motor controller system shown in FIG. 1A.

Referring to FIGS. 1A and 1B, in these particular embodiments the stepper motor controller system 10 is coupled to the fluorescence excitation/emission scanner system 12, although the stepper motor controller system 10 can be used to control other types of stepper motor-controlled systems, particularly any TTL-triggered stepper motor-controlled system. The fluorescence excitation/emission scanner system 12 includes monochromators 24 and 26, an arc lamp 22, a charge coupled device (CCD) controller 20, a stepper motor 16, a stepper motor driver board or card 14, a shaft coupler 18, a belt 34, and an optical fiber 28, although the fluorescence excitation/emission scanner system 12 can include other numbers and types of components. The monochromators 24 and 26 are each grating monochromators, although other types and numbers of monochromators can be used. The arc lamp 22 is a broadband source, such as a mercury arc lamp, although other types of light sources can be used. The CCD controller 20 is coupled to a CCD (not shown), although other types of imagers with other imaging control systems can be used. A stepper motor system includes the stepper motor 16 and the stepper motor driver card 14, although the stepper motor system can include other types and numbers of components. The stepper motor system with stepper motor 16 and stepper motor drive card 14 is independent of the stepper motor controller system 10 described herein. In these particular embodiments, the stepper motor 16 is a Warner Electric KML061F02E stepper motor and the stepper motor driver card 14 is Warner Electric SS2000MD4 drive card, although other types of stepper motors and stepper motor drive cards can be used as long as the stepper motor driver card accepts TTL pulses to trigger steps. The stepper motor 16 and the stepper motor drive card 14 used and the load to which the stepper motor 16 is coupled will limit the rotational speed. The rotational speed also depends on the frequency of the delivered TTL clock pulses from the stepper motor controller system 10 and whether the stepper motor 16 is in the full or half step mode. An advantage of the present invention is that the frequency of the delivered TTL clock pulses from the stepper motor controller system 10 can be easily adjusted.

The CCD controller 20 is coupled to the "trigger-in" input 15 in the stepper motor controller system 10. The shaft coupler 18 rotatably connects a shaft 30 of the stepper motor 16 to a shaft 32 for the monochromator 24. The belt 34 is seated over the shaft 32 for the monochromator 24 and a shaft 36 for the monochromator 26. The monochromators 24 and 26 are rotated a precise amount by the stepper motor 16 via shafts 30, 32, and 36, shaft coupler 18 and belt 34 under the control of the stepper motor controller system 10 to select a specific optical wavelength from the arc lamp 22. The stepper motor driver card 14 is coupled to the stepper motor 16 and to the "Trigger pulses to Stepper motor drive card" output 21 for the stepper motor controller system 10. The monochromator 24 is coupled to the "Upper Wavelength Limit In" input 17 and the "Lower Wavelength Limit In" input 19. The arc lamp 22 is positioned to direct light towards the monochromators 24 and 26. The optical fiber 28 is coupled to receive monochromatic light from an output of the monochromator 26.

Referring to FIGS. 1A–2E, the stepper motor controller system 10 is used to increment the rotational position of the stepper motor 16. In these particular embodiments, the stepper motor controller system 10 includes a reset system 54, a clearing system 56, a display loading system 58, a step sizing system 60, a step direction system 62, a starting system 64, size loading system 66, clock pulse enabling system 68, pulse delivery system 70, and a clock pulse divider system 72, although the stepper motor controller system 10 can include other numbers and types of components. One panel of the stepper motor controller system 10 shown in FIG. 1A also includes a single step push button switch 46 and a direction push button switch 120. Another panel of the stepper motor controller system 10 shown in FIG. 1B includes a display 38, a rotary step size selection switch 40, a reset button 42, a manual start push button switch 44, a single step push button switch 162, a wavelength direction switch 48, an all windings on/off switch 50, and a pulse mode switch 52. The calibrated display 38 keeps track of the current position of the stepper motor 16 in response to at least one of the selected size and the selected direction.

Figure 2A:
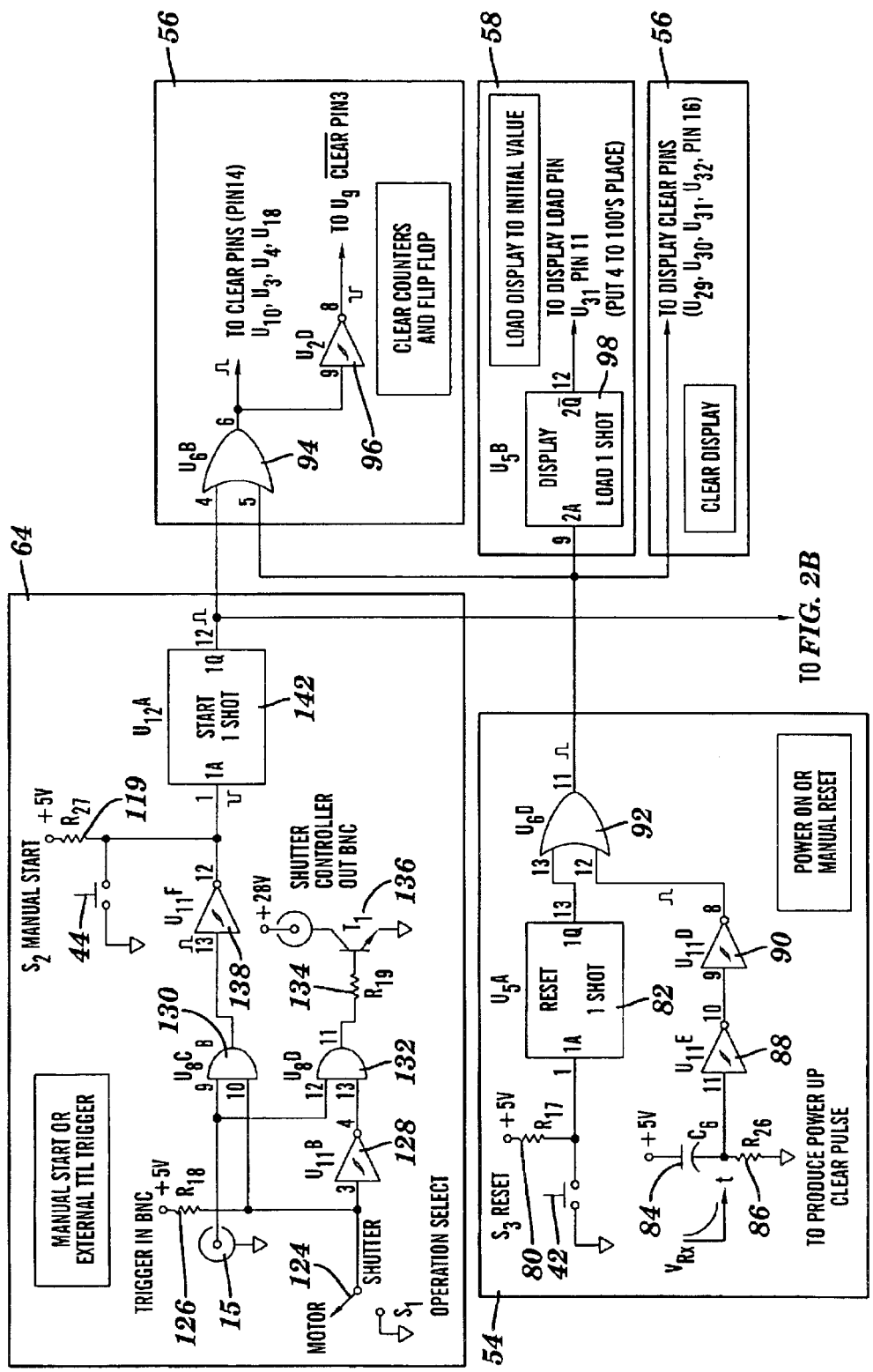
FIGS. 2A–2D are circuit diagrams of the stepper motor controller system shown in FIGS. 1A and 1B system in accordance with embodiments of the present invention.
Figure 2B:
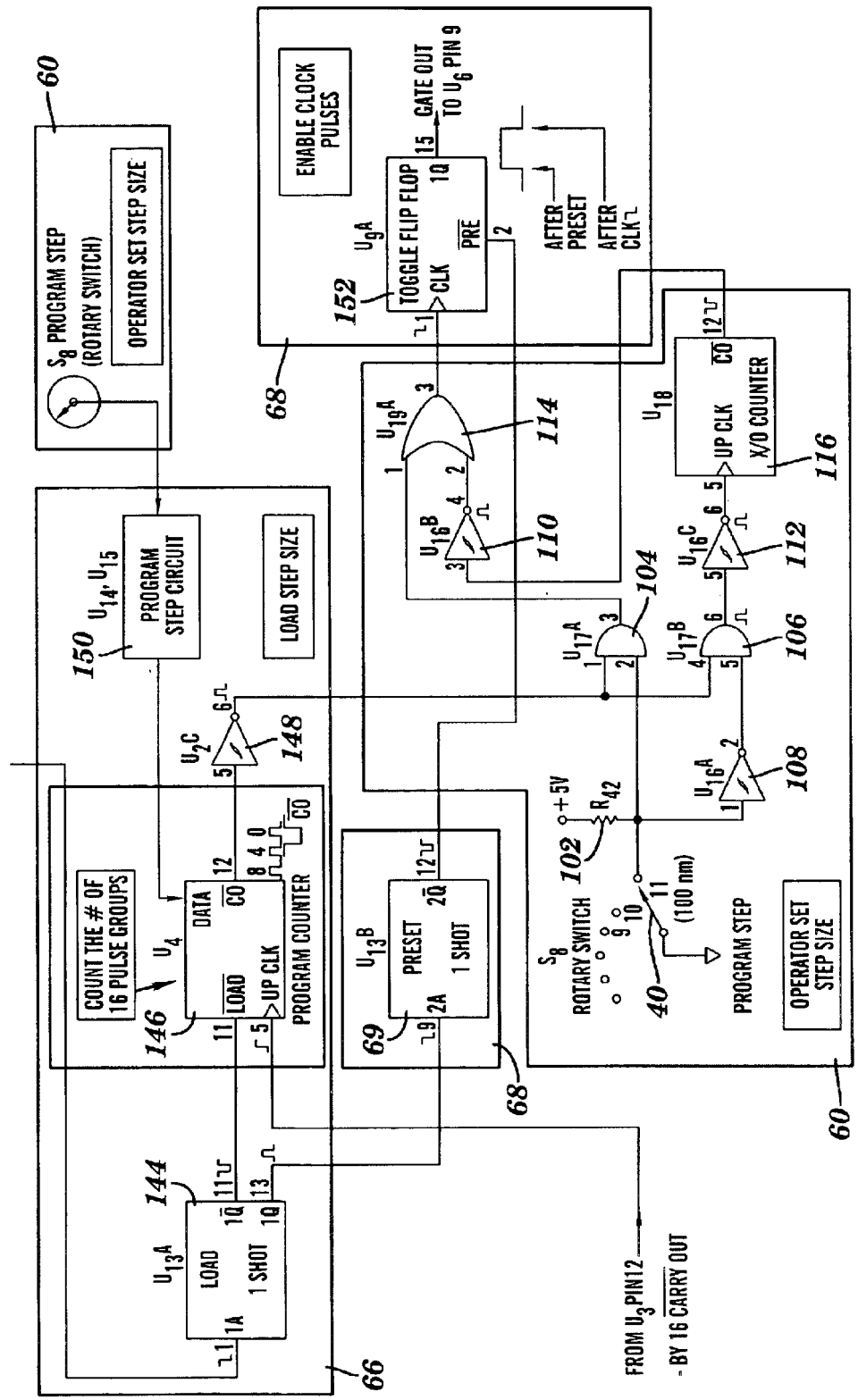
Figure 2C:
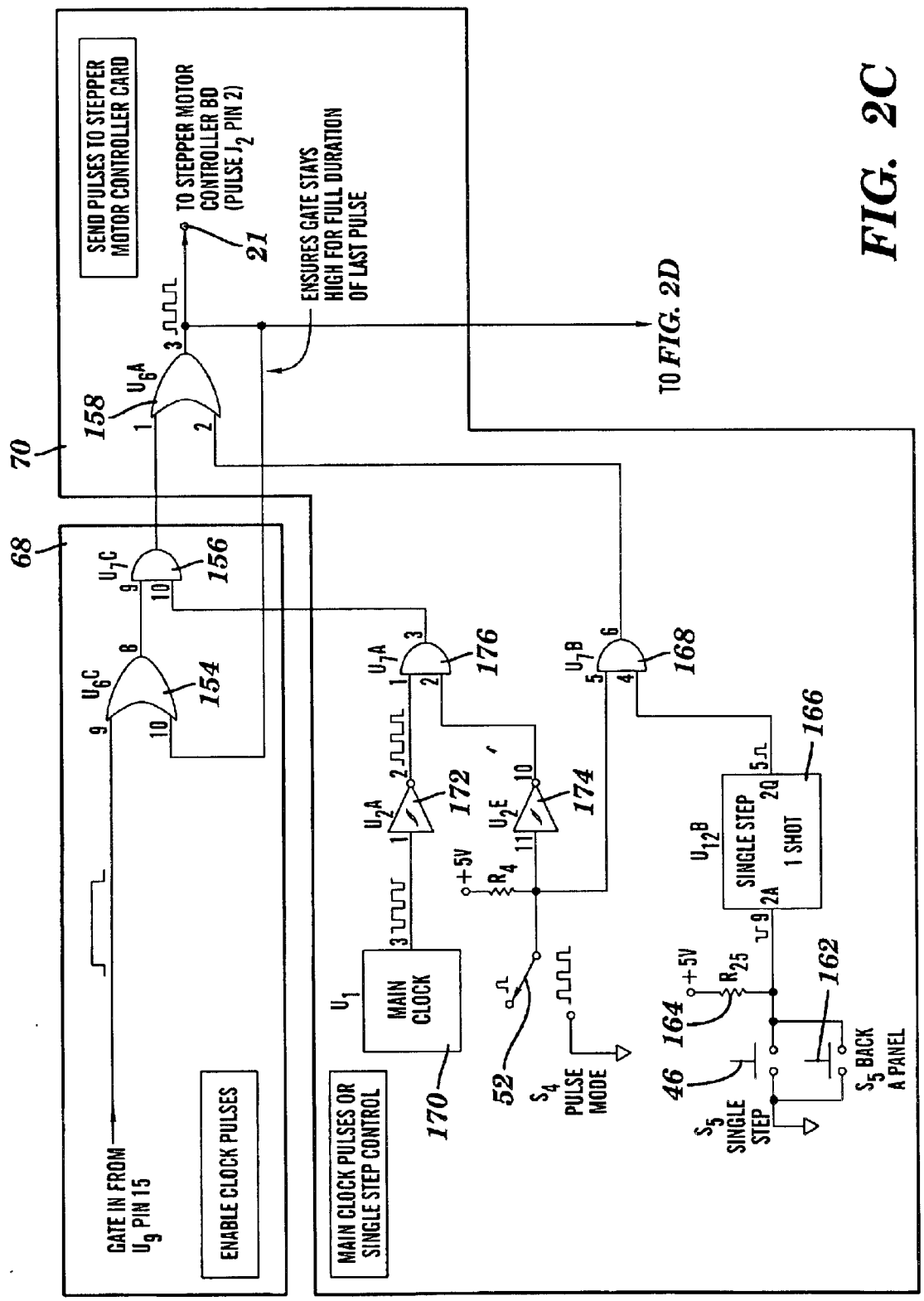
Figure 2D:
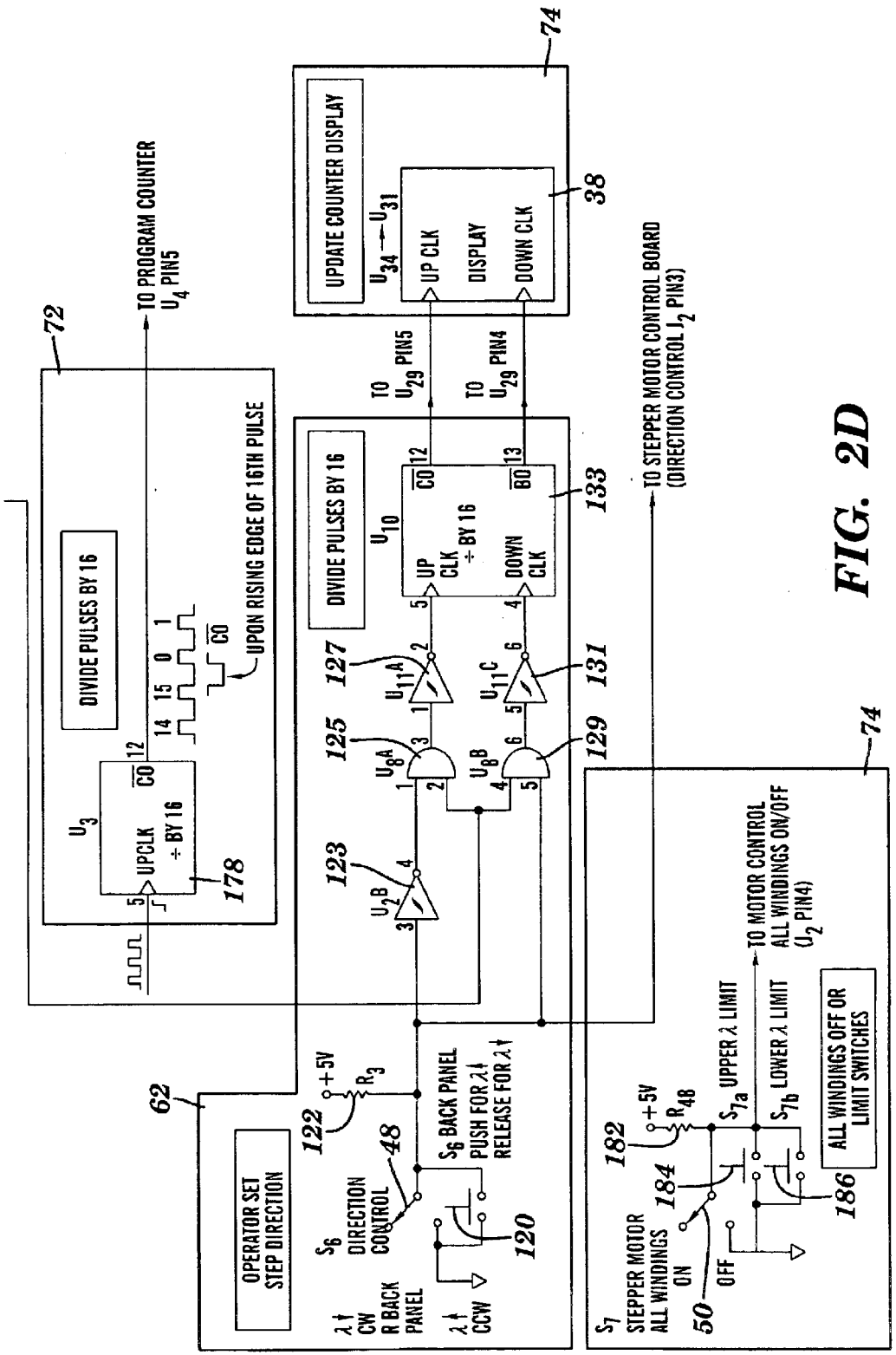

Referring to FIGS. 2A and 2B, the reset system 54 is used to reset the stepper motor controller system 10. In these particular embodiments, the reset system 54 includes a reset switch or button 42, a capacitor 84, resistors 80 and 86, inverter circuits 88 and 90, one-shot circuit 82, and an OR gate 92, although the reset system 54 can include other numbers and types of components. Reset switch 42 is normally open, although the switch 42 can have other arrangements. The reset switch 42 has one lead coupled to ground, another lead coupled to one lead of resistor 80 and to an input to the one-shot circuit 82, and is in a normally open position, although other types of switches in other positions could be used. The other lead of resistor 80 is coupled to a five-volt voltage source. An output of the one-shot circuit 82 is coupled to an input of the OR gate 92. The capacitor 84 and resistor 86 are coupled in series between the five-volt voltage source and ground. An input to one of the inverter circuits 88 is coupled between and to leads of the resistor 86 and capacitor 84 and the output of the inverter circuit 88 is coupled to an input to the inverter circuit 90. The output of the inverter circuit 90 is coupled to an input of the OR gate 92.

The clearing system 56 is used clear the stepper motor controller system 10 including display 38, flip-flop circuit 152, divide-by-sixteen circuits 133 and 178, program counter circuit 146, and times-ten circuit 116. In these particular embodiments, the clearing system 56 includes OR gate 94 and an inverter circuit 96, although the clearing system 56 can include other numbers and types of components. One input to the OR gate 94 is coupled to an output of the one-shot circuit 142 and the other input to the OR gate 94 is coupled to an output pin of OR gate 92 which is also coupled to the clear pins for the display 38. An output of the OR gate 94 is coupled to clear pins for divider circuits 133 and 178, counters 116 and 146, and to the input of inverter circuit 96. An output of the inverter circuit 96 is coupled to clear pin of flip-flop circuit 152.

The display loading system 58 is used to load the display 38 with the initial programmed count value. In these particular embodiments, the display loading system 58 includes a one-shot circuit 98, although the display loading system 38 can include other numbers and types of components. An input to the one-shot circuit 98 is coupled to an output of the OR gate 92 and an output of the one-shot circuit 98 is coupled to the display 38.

The step sizing system 60 (shown in two boxes in FIG. 2B) is used to set the size of the step of the stepper motor 16. In these particular embodiments, the step sizing system 60 includes a rotary switch 40, a resistor 102, inverter circuits 108, 110, and 112, AND gates 104 and 106, a times-ten circuit 116, and an OR gate 114, although the step sizing system 60 can include other numbers and types of components. The step sizing system 60 includes the Program Step circuit 150 which is made up of Decimal-to-BCD Decoder circuit and Inverter circuits. It also includes the clock pulse divider system 72 The rotary switch 40 has one lead coupled to ground and another lead coupled to one lead of resistor 102, an input to inverter circuit 108, and an input to AND gate 104 (for the 100 nm step mode only). The other lead of resistor 102 is coupled to a five-volt voltage source and another input to AND gate 104 is coupled to an output from inverter circuit 148. The output from inverter circuit 148 and the output from inverter circuit 108 are coupled to inputs of AND gate 106. An output of AND gate 106 is coupled to an input of inverter circuit 112. An output of inverter circuit 112 is coupled to an input to times-ten circuit 116. An output of times-ten circuit 116 is coupled to an input to inverter circuit 110. An output from inverter circuit 110 and an output from AND gate 104 are coupled to inputs of OR gate 114. The other step sizes are determined by rotary switch 40 connections to the Program Step circuit 150. In these particular embodiments, the rotary switch 40 allows an operator to select a step size from 1 nm to 10 nm or a 100 nm step, although the size of the step can vary as needed for the particular application.

The step direction system 62 is used to set the direction for each step of the stepper motor 16. In these particular embodiments, the step direction system 62 includes a wavelength switch 48, a push button switch 120 (for back panel access), and a resistor 122 (Inverter circuits 123, 127, and 131, AND gates 125 and 129, and a divide-by-sixteen circuit 133 are used for proper display tracking of the step direction and increment), although the step direction system 62 can include other numbers and types of components. Wavelength switch 48 and push button switch 120 are normally open, although the switches 48 and 120 can have other arrangements. A lead for wavelength switch 48 and a lead for push button switch 120 are coupled to ground and another lead for wavelength switch 48 and another lead for push button switch 120 are coupled to a lead for resistor 122, to an input to inverter circuit 123, and to an input to AND gate 129. Another lead of resistor 122 is coupled to a five volt voltage source. An output of inverter circuit 123 is coupled to an input to AND gate 125. Another input to AND gate 125 and another input to AND gate 129 are coupled to an output from OR gate 158. An output from AND gate 125 is coupled to an input to inverter circuit 127 and an output from AND gate 129 is coupled to an input to inverter circuit 131. An output from inverter circuit 127 and an output from inverter circuit 131 are coupled to inputs to divide-by-sixteen circuit 133.

The starting system 64 is used to start the operation of the stepper motor controller system 10. In these particular embodiments, the starting system 64 for controlling a twenty-eight volt shutter includes the manual start push button switch 44, a switch 124, resistors 119, 126, and 134, an inverter circuits 128 and 138, AND gates 130 and 132, a transistor 136, and a one-shot circuit 142, although the starting system 64 can include other numbers and types of components, for example in another embodiment starting system may comprise inverter circuit 138, manual start push button switch 44, resistor 119 and one-shot circuit 142. One lead of switch 124 is coupled to ground and another lead for switch 124 is coupled to an input of inverter circuit 128, to an input to AND gate 130, and to one lead of a resistor 126. Another lead of resistor 126 is coupled to a five volt voltage source. An output of inverter circuit 128 is coupled to an input to AND gate 132. Another input to AND gate 132 and an input to AND gate 130 are coupled to the "Trigger In" input 15. An output of the AND gate 132 is coupled to the base of a transistor 136. A collector of the transistor 136 is coupled to a "shutter controller out" output (not shown) which is coupled to a twenty-eight volt voltage source and an emitter of the transistor 136 is coupled to ground. An output of AND gate 138 is coupled to an input to one-shot circuit 142, to one lead of resistor 119 and to one lead of manual start push button switch 44. Another lead of manual start push button switch 44 is coupled to ground and another lead of resistor 119 is coupled to a five-volt voltage source.

Figure 2E:
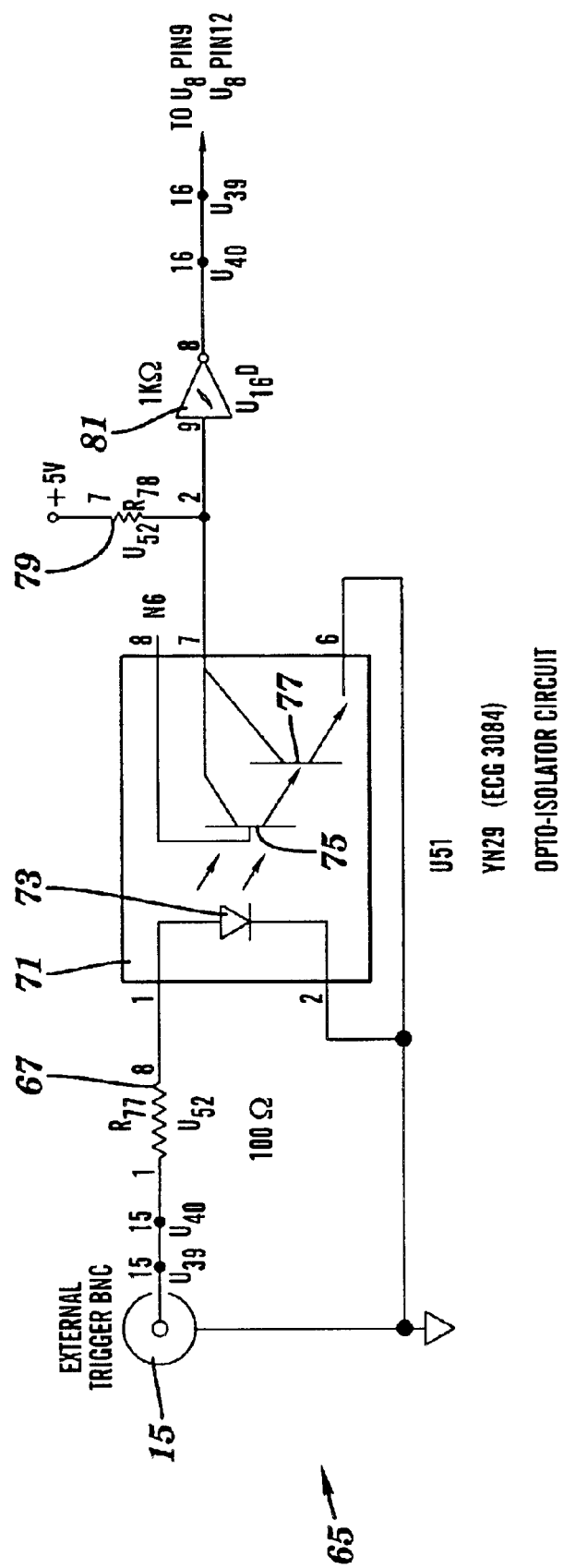
FIG. 2E is a circuit diagram of a false triggering prevention circuit for use in a starting system in the stepper motor controller system in accordance with embodiments of the present invention.
Figure 3:
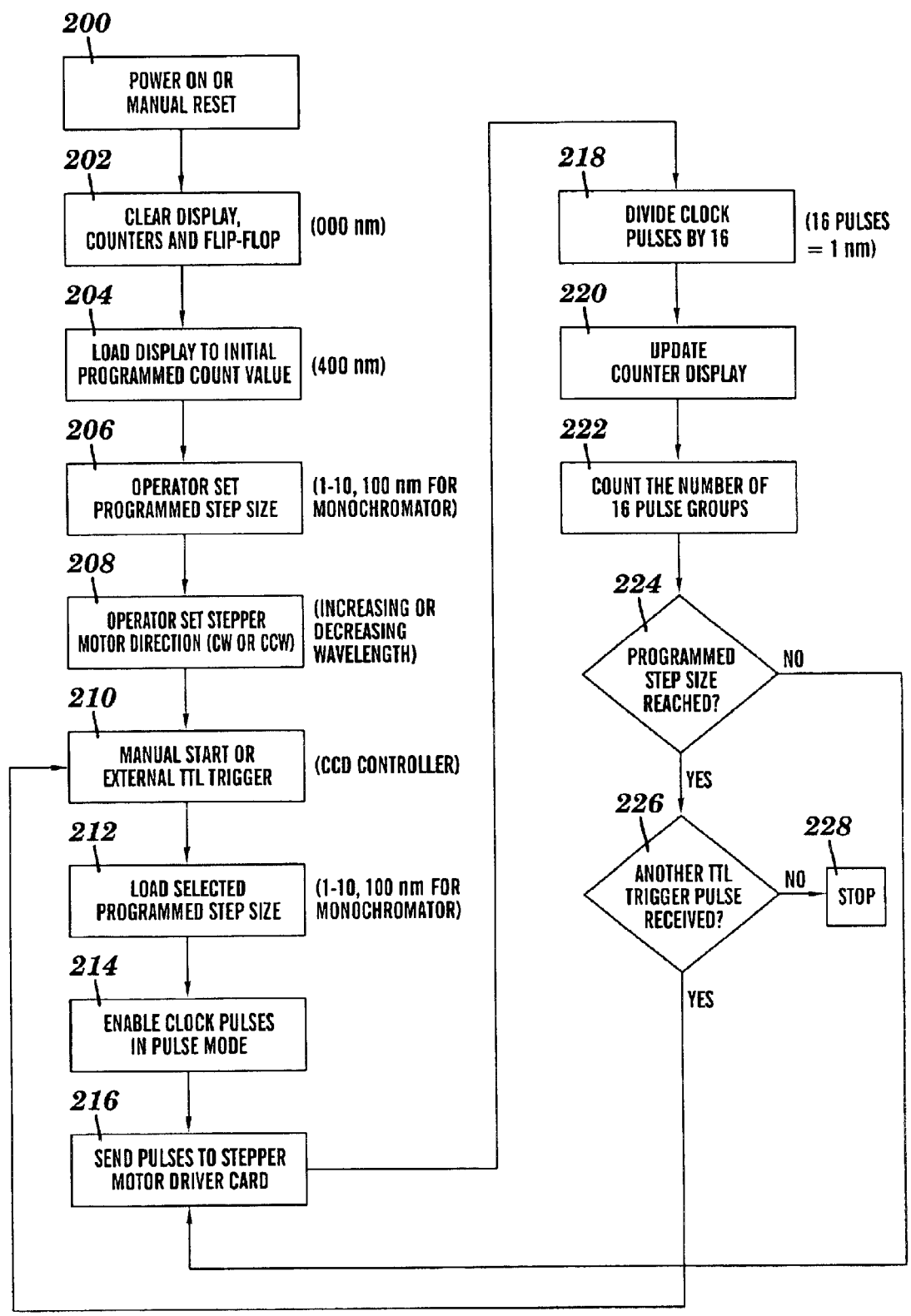
FIG. 3 is a flow chart of a method for controlling a stepper motor system in accordance with embodiments of the present invention.

Referring to FIG. 2E, an optional false triggering prevention circuit 65 for use in the starting system 64 in accordance with other embodiments of the present invention is illustrated. The false prevention circuit 65 is used to help prevent false triggers by the starting system 64. In these particular embodiments, the false triggering prevention circuit 65 includes resistors 67 and 79, an opto-isolator circuit with a diode 73 and transistors 75 and 77, and an inverter circuit 81, although the false triggering prevention circuit 65 and/or the opto-isolator circuit 71 can include other numbers and types of components. In the starting system 64, one lead of resistor 67 is coupled to the "Trigger In" input 15 and another lead of resistor 67 is coupled to an anode of diode 73 and the cathode of the diode 73 is coupled to ground. An input to the base of transistor 75 is not connected, a collector of transistor 75 is coupled to a collector of transistor 77, a lead of resistor 79 and an input to inverter circuit 81. An emitter of transistor 75 is coupled to the base of transistor 77, a collector of transistor 77 is coupled to the lead of resistor 79 and the input to inverter circuit 81, and an emitter of transistor 77 is coupled to ground. Another lead of resistor 79 is coupled to a voltage source and an output to inverter circuit 81 is coupled to inputs 9 and 12 of AND gates 130 and 132 in starting system 64.

Referring to FIG. 2B, the step size loading system 66 is used to load the selected step size. In these particular embodiments, the step size loading system 66 includes a one-shot circuit 144, a program counter circuit 146, an inverter circuit 148, and program step circuit 150, although the step size loading system 66 can include other numbers and types of components. An input to the one-shot circuit 144 is coupled to an output of one-shot circuit 142. An output of the one-shot circuit 144 is coupled to an input to the program counter circuit 146. An input to the program step circuit 150 is coupled to program step rotary switch 40. An output from program stop circuit 150 is coupled to another input to program counter circuit 146. Another input to program counter circuit 146 is also coupled to an output from divide-by-sixteen circuit 178. An output from program counter circuit 146 is coupled to an input of inverter circuit 148.

The clock pulse enabling system 68 is used to enable the clock pulse or pulses for the stepper motor controller system 10. In these particular embodiments, the clock pulse enabling system 68 (shown in boxes in FIGS. 2B and 2C) includes one-shot circuit 69, flip flop circuit 152, OR gate 154, and AND gate 156, although the clock enabling system 68 can include other numbers and types of components. An input to the one-shot circuit 69 is coupled to an output of one-shot circuit 144 and an output to the one-shot circuit 69 is coupled to the PRE NOT input of the flip flop circuit 152. Another input to the flip-flop circuit 152 is coupled to an output of the OR gate 114. An output to the flip-flop circuit 152 is coupled to an input of the OR gate 154 and an output of OR gate 158 is coupled to another input to the OR gate 154. An input to AND gate 156 is coupled to an output of OR gate 154 and another input to AND gate 156 is coupled to an output to AND gate 176.

The pulse delivery system 70 is used to send pulses to the stepper motor driver card 14. In these particular embodiments, the pulse delivery system 70 includes single step push button switch 46, single step push button switch 162, pulse mode switch 52, resistors 164 and 165, one-shot circuit 166, inverter circuits 172 and 174, AND gates 168 and 176, and OR gate 158, although the pulse delivery system 70 can include other numbers and types of components. Single step push button switch 46, single step push button switch 162, and pulse mode switch 52 are normally open, although the switches 46 and 52 can have other arrangements. A main clock 170 has an output coupled to an input to an inverter circuit 172. Outputs of inverter circuits 172 and 174 are coupled to inputs to AND gate 176. An output of AND gate 176 is coupled to an input to AND gate 156. A lead of single step push button switch 46, a lead of single step push button switch 162, and a lead of pulse mode switch 52 are all coupled to ground. Another lead of switch 46 is coupled to a lead of resistor 164 and to an input to a one-shot circuit 166. Another lead of switch 162 is coupled to a lead of resistor 164 and to an input to a one-shot circuit 166. An output of one-shot circuit 166 is coupled to an input to AND gate 168. Another lead of pulse mode switch 52 is coupled to a lead of resistor 165, an input to inverter circuit 174, and another input to AND gate 168. Another lead of resistor 165 and another lead of resistor 164 are each coupled to a five-volt voltage source. An input to OR gate 158 is coupled to an output of AND gate 156 and another input to OR gate 158 is coupled to an output of AND gate 168. The output of OR gate 158 is coupled to the "TTL Pulses to Stepper Motor Driver Card" output 21.

The clock pulse divider system 72 is used to divide the clock pulses from the pulse delivery system 70. In these particular embodiments, the clock pulse divider system 72 includes a divide-by-sixteen circuit 178, although the clock pulse divider system 72 can include other numbers and types of components. An input to the divide-by-sixteen circuit 178 is coupled to an output of the OR gate 158 and an output from the divide-by-sixteen circuit 178 is coupled to an input to the program counter circuit 146.

The stepper motor controller system 10 also includes an "all windings on/off" system 74. The "all windings on/off" system 74 can be used to disable the motor drive in an emergency or for manually positioning the stepper motor drive shaft 30 during setup. In these particular embodiments, the "all windings on/off" system 74 includes the all windings on/off switch 50, push button limit switches 184 and 186, and resistor 182, although the all-windings-on/off system 74 can include other numbers and types of components. One lead of all windings on/off switch 50, one lead of push button switch 184, and one lead of push button switch 186 are coupled to ground. Another lead of all windings on/off switch 50, another lead of push button switch 184, and another lead of push button switch 186 are coupled to one lead of resistor 182 and to the stepper motor control all windings on/off connection located on the stepper motor driver card 14. Another lead for resistor 182 is coupled to a five-volt voltage source.

The operation of the stepper motor controller system 10 in a grating monochromator system in accordance with one example is discussed below with reference to FIGS. 1–4. In step 200, when the manual reset button switch 42 is momentarily pressed, or upon initial power-up, a single high-going pulse is generated through one-shot circuit 82, or through resistor 86, capacitor 84, inverter circuits 88 and 90, respectively. This high-going pulse is gated through the OR gate 92.

In step 202, the high-going pulse gated through OR gate 92 is gated through OR gate 94 to the clear pins of the divide-by-sixteen circuits 133 and 178, program counter circuit 146, times-ten circuit 116. The high-going pulse gated through OR gate 94 also goes to the clear pins of the display 38 and through inverter circuit 96 to the clear pin of the flip flop circuit 152.

In step 204, the high-going pulse gated through the OR gate 92 also triggers one-shot circuit 98 to send a delayed load pulse to the display 38 to initialize the display reading, such as an initial reading 400 nm for this example.

In step 206, the operator can select the size of the step with the rotary switch 40. In this particular embodiment, the operator can select a step size from one nm to ten nm or one-hundred nm, although the step size options which can be selected can vary for other applications. If a step from one nm to ten nm is selected, then the switch 40 grounds one corresponding input of the program step circuit 150 (Decimal-to-BCD Decoder and Inverter circuits). If the one-hundred nm step is selected, then the grounded signal gates on through inverter circuit 108, AND gate 106, and inverter circuit 112 and then is transmitted to the times-ten circuit 116 which multiplies the ten nm signal by ten to get a one-hundred nm step.

In step 208, a wavelength direction switch 48 provides a high or low TTL value for clockwise (CW) decreasing wavelength or counterclockwise (CCW) increasing wavelength, respectively, to the stepper motor driver card 14. In addition, the display is properly updated by the signal generated by the position of switch 48 gates through inverter circuit 123 to the AND gates 125 and 129 which also receive the pulses from OR gate 158. Depending on the position of switch 48, one of the AND gates outputs TTL pulses which are gated through either inverter circuit 127 or 131 to the down clock or up clock inputs of the divide-by-sixteen circuit. The divide-by-sixteen circuit 133 outputs the pulses to the display 38. The direction can also be controlled in the same manner by pressing the direction push button 120.

In step 210, when the manual start push button switch 44 is pressed a low-going TTL pulse is provided to one-shot circuit 142. The output of one-shot circuit 142 outputs a pulse to trigger the clear sequence of the counters and flip flop and begins the stepping sequence. A high going TTL pulse transmitted to the "Trigger IN" input 15 from the CCD controller 20, although other external devices could provide the high going TTL pulse, accomplishes the same thing as pressing the manual start push button 44. If switch 124 is in the "Shutter" position, then a low level is applied to one input of AND gate 130 blocking the external trigger signal from the stepper motor controller signal. It also applies the low level to the input of inverter 128 that transmits a high level to one input of AND gate 132. This allows the External Trigger input signal to pass through AND gate 132 to "bias on" transistor 136 through resistor 134 thus providing drive current to an external shutter connected to the twenty-eight volt power supply. It is independent of the stepper motor controller. We only included it here because the stepper motor controller box contained a twenty-eight volt power supply.

In step 212, the output pulse from one-shot circuit 142 is transmitted to the one-shot circuit 144 that outputs a pulse which triggers the program counter circuit 146 to load the selected step size from step sizing system 60.

In step 214, the pulse output from one-shot circuit 144 also triggers the one-shot circuit 69 to preset the flip-flop circuit 152 to the enable state. This provides a TTL high-level to OR gate 154 and then to AND gate 156 to enable TTL clock pulses from the main clock 170 in the pulse delivery system 70 to pass through AND gate 156.

In step 216, TTL clock pulses passing through AND gate 156 are sent to the stepper motor driver card 14 through OR gate 158. If the single pulse mode is selected through switch 52, individual TTL pulses are generated by pressing switches 46 or 162 which triggers one-shot circuit 166 to send single pulses to the stepper motor driver card 14 through AND gate 168 and OR gate 158. Pulse mode switch 52 can be set to a single pulse mode or a pulse series mode. The particular mode selected by pulse mode switch 52 outputs either a high or low level to one of the inputs to the AND gate 176 which controls the transmission of clock pulses which are transmitted to another input of the AND gate 176 from the main clock 170. The particular mode selected by pulse mode switch 52 output either a high or low level to one of the inputs to the AND gate 168 which controls the transmission of the single transmitted to another input of the AND gate 168 from the one-shot circuit 166.

In step 218, the TTL clock pulses from OR gate 158 are sent to the divide-by-sixteen circuit 178 that outputs the divided signals to program counter circuit 146. In this particular embodiment, this is calibrated from the relationship between the pulses required for one shaft rotation by stepper motor 16 and the corresponding wavelength increment of the monochromators 24 and 26 used.

In step 220, these TTL clock pulses from OR gate 158 are also gated through AND gates 125 and 129, and inverter circuits 127 and 131 to the down clock or up clock inputs of the divide-by-sixteen circuit 133 (depending on the direction set). The divide-by-sixteen circuit 133 outputs the signals to update the counters in the display 38 for an accurate, updated wavelength display (calibrated in nm for this particular example).

In step 222, the output of the divide-by-sixteen circuit 178 is sent to the up clock input of program counter circuit 146 to count the groups of sixteen TTL pulses that were sent to the stepper motor driver card 14. In this particular embodiment, sixteen steps adjusts the wavelength one nm, although the number of steps needed for an adjustment of a device will vary based on the particular application.

In step 224, the stepper motor controller system 10 continually sends out TTL clock pulses to the stepper motor 16 through the stepper motor driver card 14 while program counter circuit 146 counts the number of groups of sixteen pulses and the display 38 is updated. In these particular embodiments, the stepper motor 16 takes four-hundred pulses for one shaft rotation and the monochromaters 24 and 26 moves twenty-five nm for one shaft rotation, one nm=sixteen steps, although these values can vary for other applications. When the preprogrammed step size is reached, a pulse is generated by program counter circuit 146 that toggles flip-flop circuit 152 to the TTL low state. This disables AND gate 156 that prevents any more TTL clock pulses from going to the stepper motor drive card 14 and the stepper motor 16 stops.

Figure 4A:
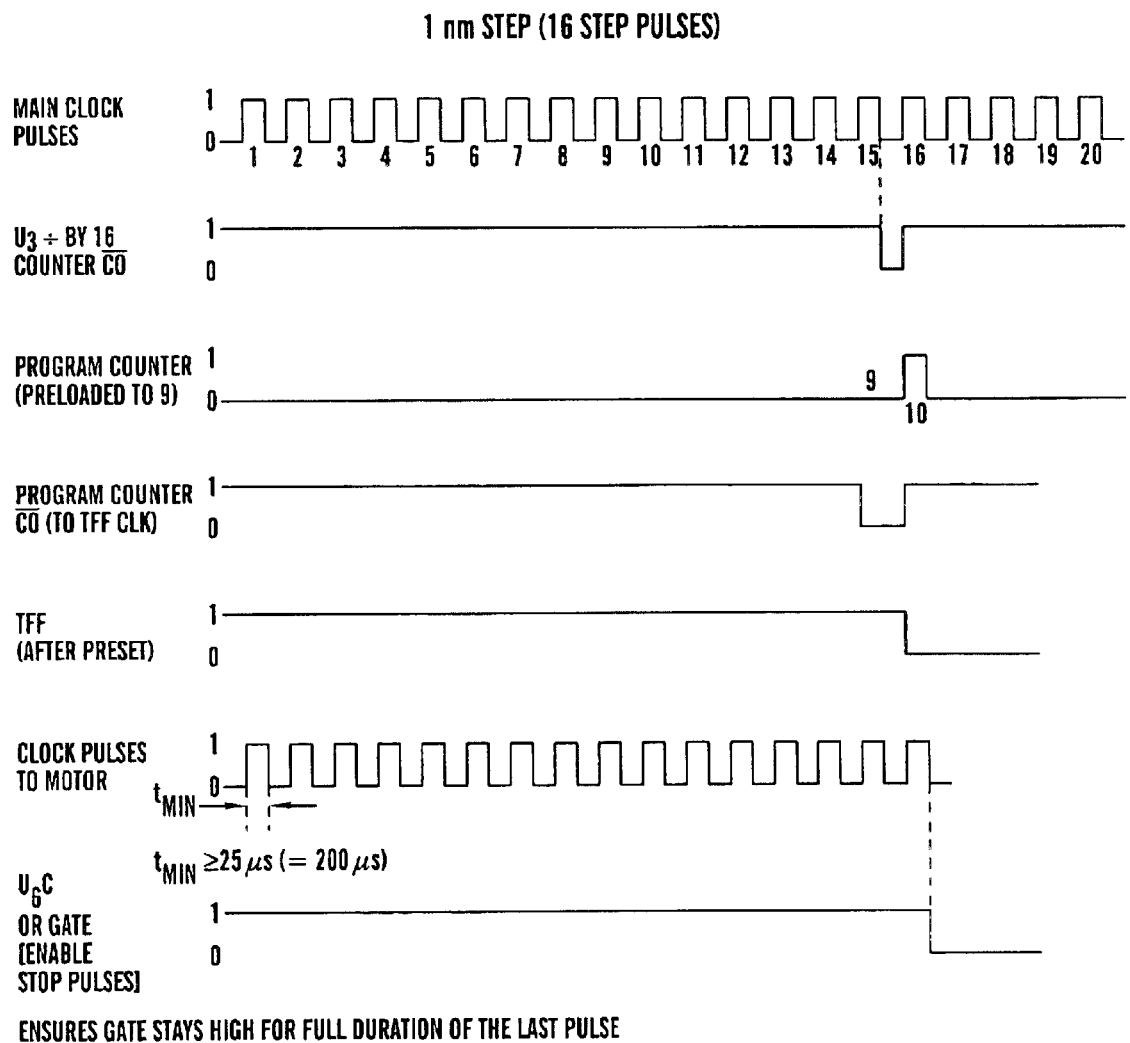
FIG. 4A is a timing diagram for the operation of the stepper motor controller system for a one nm increment in accordance with embodiments of the present invention.
Figure 4B:
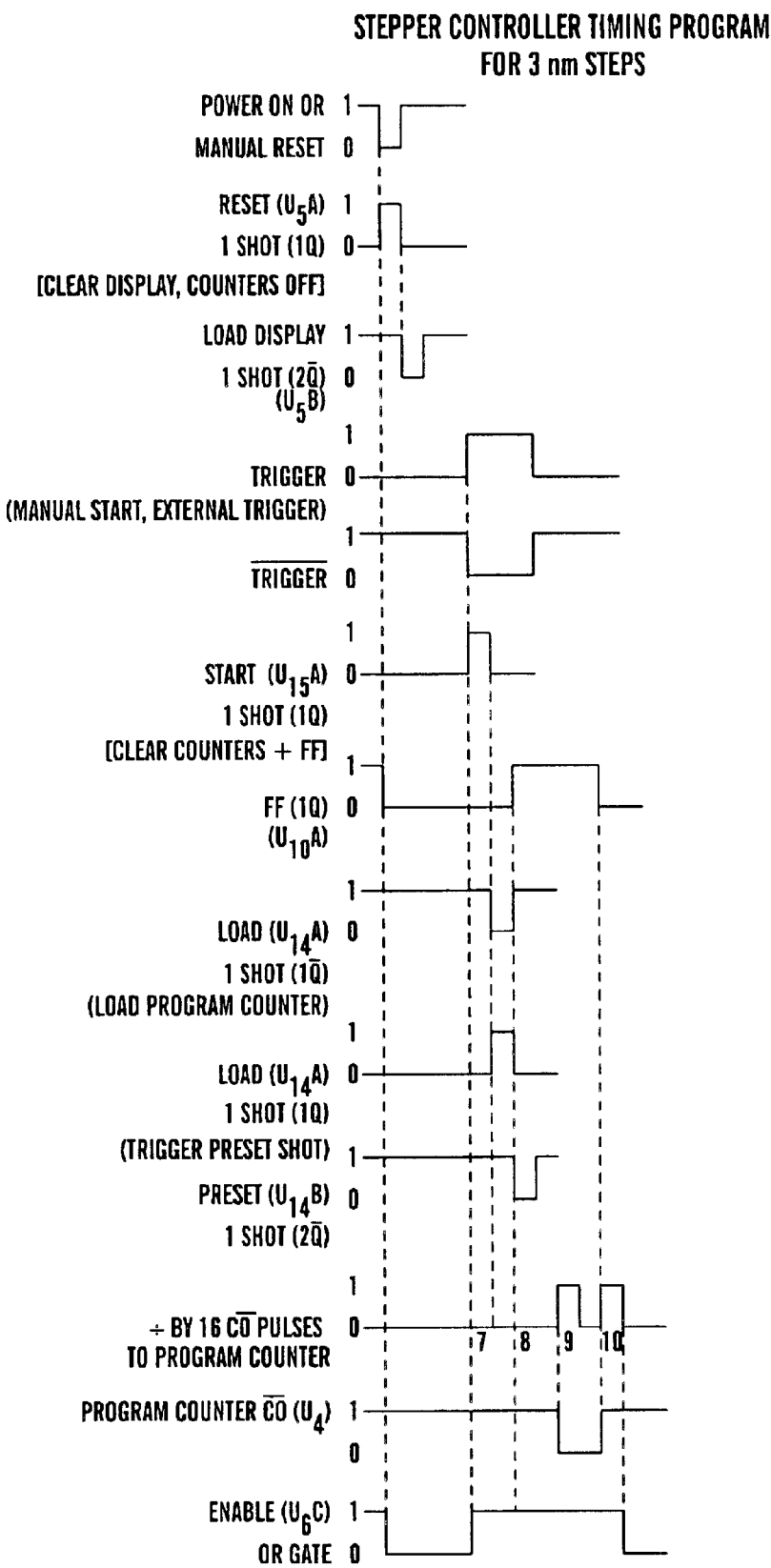
FIG. 4B is a timing diagram for the operation of the stepper motor controller system for a three nm increment in accordance with embodiments of the present invention.

In step 226, if another TTL trigger pulse is received by one-shot circuit 142, then the pulse sequence described above repeats. This new TTL trigger pulse can be accomplished by pressing the manual start switch 44 or receiving another TTL trigger pulse through the "Trigger In" input 15 from CCD controller 20 in this example. In this way the cycle is maintained indefinitely or until a limit switch 50 sends an "All wires off" signal to the stepper motor drive card 14 to disable the stepper motor 16. A timing diagram for the pulses described above for this example of an operation is illustrated in FIG. 4.

Accordingly, as illustrated above, the stepper motor controller system 10 automatically increments the rotational position of the stepper motor by a pre-programmed amount in a simple, flexible, easy-to-use and low-cost manner. The particular number of steps and direction of rotation is selectable. The operation of the stepper motor controller system 10 can be triggered manually or by an external transistor-transistor logic (TTL)-trigger pulse from an external device. The stepper motor controller system 10 can deliver a series of TTL pulses to any TTL-compatible stepper motor driver card or can operate in a single pulse mode. Digital counters ensure that the programmed position is precise and repeatable, within the step accuracy of the controlled stepper motor and its driver. The stepper motor controller system 10 is a stand-alone controller and does not need a computer and special software to control the stepper motor 16 as most commercially available control systems do.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefor, is not intended to limit the claimed processes to any order except as may be specified in the claims. Accordingly, the invention is limited only by the following claims and equivalents thereto.

What is claimed is:

1. A method for controlling a stepper motor system, the method comprising:

selecting a size for at least one step to be taken by the stepper motor system;

selecting a direction for the at least one step;

generating at least one trigger signal for the at least one step of the selected size and in the selected direction;

transmitting the generated at least one trigger signal to the stepper motor system to take the at least one step at the selected size in the selected direction; and resetting the selected size and the selected direction for the at least one step.

2. A method for controlling a stepper motor system, the method comprising:

selecting a size for at least one step to be taken by the stepper motor system;

selecting a direction for the at least one step;

generating at least one trigger signal for the at least one step of the selected size and in the selected direction; and transmitting the generated at least one trigger signal to the stepper motor system to take the at least one step at the selected size in the selected direction;

wherein the selecting the size for the at least one step further comprises calibrating the selected size for the at least one step to a particular application.

3. A method for controlling a stepper motor system, the method comprising:

selecting a size for at least one step to be taken by the stepper motor system;

selecting a direction for the at least one step;

generating at least one trigger signal for the at least one step of the selected size and in the selected direction;

transmitting the generated at least one trigger signal to the stepper motor system to take the at least one step at the selected size in the selected direction; and requesting that the at least one step of the selected size and in the selected direction be taken, wherein the generating the at least one trigger generates the at least one trigger signal when the requesting that the at least one step be taken is received; and wherein the requesting that the at least one step be taken further comprises manually triggering the requesting.

4. Method for controlling a stepper motor system, the method comprising:

selecting a size for at least one step to be taken by the stepper motor system;

selecting a direction for the at least one step;

generating at least one trigger signal for the at least one step of the selected size and in the selected direction; and transmitting the generated at least one trigger signal to the stepper motor system to take the at least one step at the selected size in the selected direction;

wherein the at least one trigger signal comprises at least one TTL clock pulse.

5. The method as set forth in claim 4 wherein the selected direction is clockwise.

6. The method as set forth in claim 4 wherein the selected direction is counter clockwise.

7. The method as set forth in claim 4 further comprising requesting that the at least one step of the selected size and in the selected direction be taken, wherein the generating the at least one trigger generates the at least one trigger signal when the requesting that the at least one step be taken is received.

8. The method as set forth in claim 7 wherein the requesting that the at least one step be taken further comprises receiving an external signal to trigger the requesting.

9. The method as set forth in claim 4 wherein the transmitting of the at least one trigger signal to the stepper motor system continues until the at least one step at the selected size in the selected direction has been reached.

10. The method as set forth in claim 9 further comprising determining if a request for another one of the at least one more steps has been received.

11. The method as set forth in claim 10 wherein the generating the at least one trigger signal generates another one of the at least one trigger signals of the selected size and in the selected direction for the stepper motor system; and wherein the transmitting the at least one trigger signal to the stepper motor system transmits the another one of the at least one trigger signals of the selected size and in the selected direction to the stepper motor system.

12. A system for controlling a stepper motor system, the system comprising:

a sizing system that selects a size for at least one step to be taken by the stepper motor system;

a direction system that selects a direction for the at least one step;

a generation system that generates at least one trigger signal for the at least one step of the selected size and in the selected direction; and a transmission system that transmits the generated at least one trigger signal to the stepper motor system to take the at least one step at the selected size in the selected direction;

wherein the sizing system further comprises a calibration system that calibrates the selected size for the at least one step to a particular application.

13. System for controlling a stepper motor system, the system comprising:

a sizing system that selects a size for at least one step to be taken by the stepper motor system;

a direction system that selects a direction for the at least one step;

a generation system that generates at least one trigger signal for the at least one step of the selected size and in the selected direction; and a transmission system that transmits the generated at least one trigger signal to the stepper motor system to take the at least one step at the selected size in the selected direction;

wherein the at least one trigger signal comprises at least one TTL clock pulse.

14. The system as set forth in claim 13 further comprising a reset system that resets the sizing system that selects the size, the direction system that selects the direction and a display.

15. The system as set forth in claim 13 wherein the selected direction is clockwise.

16. The system as set forth in claim 13 wherein the selected direction is counter clockwise.

17. The system as set forth in claim 13 further comprising a starting system that receives at least one request that the at least one step of the selected size and in the selected direction be taken, wherein the generation system generates the at least one trigger signal when the starting system receives the at least one request that the at least one step be taken.

18. The system as set forth in claim 17 wherein the starting system comprises a switch.

19. The system as set forth in claim 17 wherein the starting system comprises an external trigger system that triggers the at least one request.

20. The system as set forth in claim 13 wherein the transmission system transmits the at least one trigger signal to the stepper motor system until the at least one step at the selected size in the selected direction has been reached.

21. The system as set forth in claim 20 further comprising a determination system that determines if a request for another one of the at least one more steps has been received.

22. The system as set forth in claim 21 wherein the generation system generates another one of the at least one trigger signals of the selected size and in the selected direction for the stepper motor system; and wherein the transmission system transmits the another one of the at least one trigger signals of the selected size and in the selected direction to the stepper motor system.

* * * * *